Patented May 3, 1949

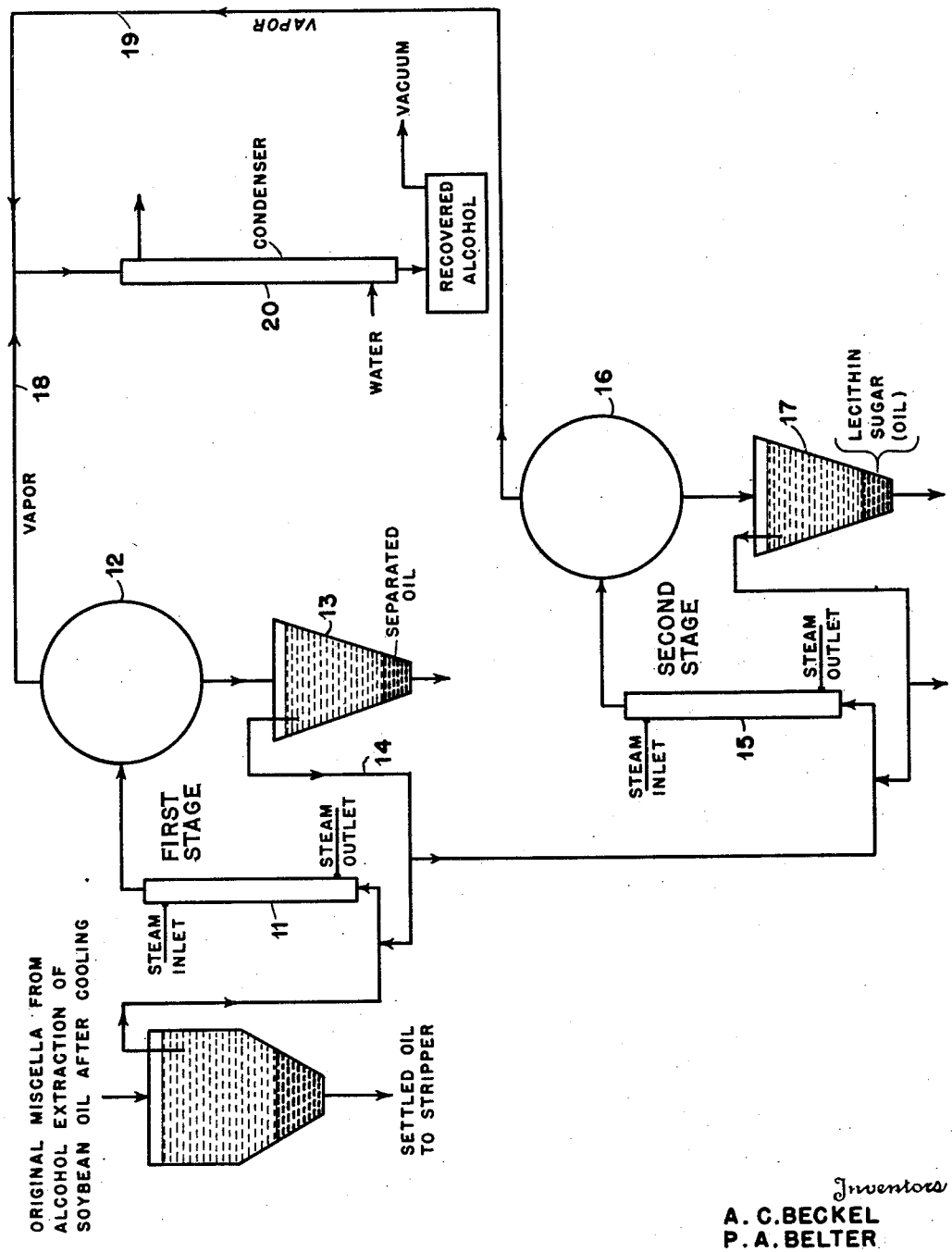

2,469,147

UNITED STATES PATENT OFFICE 2,469,147

PROCESS FOR THE RECOVERY OF OIL AND BY-PRODUCTS FROM ALCOHOLIC SOLUTIONS OF OLEAGINOUS MATERIALS

Arthur C. Beckel, Peoria, and Paul A. Belter, Pekin, Ill., assignors to the United States of America as represented by the Secretary of Agriculture Application April 18, 1945, Serial No. 589,006

11 Claims. (Cl. 260—412.4)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to the recovery of ethyl alcohol, oil, and byproducts from solutions resulting from extraction of oil-bearing seeds, such as soybeans, with alcohol or certain alcoholic solutions, and the general object of this invention is the provision of a continuous process for accomplishing this result.

Vegetable oils are generally obtained from plant materials either by pressing or by extraction with a volatile solvent. The extraction process is rapidly gaining in favor because of its economic advantages and because it is possible to exercise better control over the qualities of the products derived. With the solvents in general use, it is still necessary to subject the products to rather extensive refining processes which include removal of the heat precipitable material known as "break" from the oils and removal of the bitter and odoriferous constituents from the oil and meal by steaming.

Extraction of soybean oil from the seed by means of ethyl alcohol has many advantages among which are: (1) The separation of a "non-break" type of soybean oil instead of the "break" type of oil prepared by other methods; (2) the production of a superior residual meal having a bland flavor and a highly improved color which permit the incorporation of the meal in foods for human consumption, and also permit the preparation of a protein equaling casein in color; and (3) the recovery of byproducts not obtainable by expression methods or by extraction with the usual solvents.

A fully continuous process for the extraction of vegetable oils by means of ethyl alcohol is necessary before this solvent can compete in economy with the more usual solvents (hexane and trichlorethylene) which do operate in a continuous cycle and so reduce manipulative and labor charges to a minimum. This continuity of process in the case of ethyl alcohol has not heretofore been accomplished because continuous recovery of residual oil and of byproducts has not been possible in accordance with prior art methods.

The method used for the extraction of vegetable oils by means of alcohol comprises extracting the oil at or near the boiling point of the alcohol, cooling, separating that oil which settles, and recirculating the supernatant solution. At the last step in the cycle the solution is drawn off into a still to recover the oil remaining in solution. This oil is known as the "residual oil."

With the exception of the last step, the usual batch process could be converted into a continuous process by recycling the alcoholic supernatant solution, for example, by removing a portion of the solution continuously and adding recovered alcohol in like amounts so that the concentration of the dissolved materials remains constant as the extraction proceeds continuously. The oil-bearing material could be conveyed through the system by one of several known methods.

The final step, that is, the recovery of the alcohol, the oil which did not separate on cooling, and the byproducts, has not been heretofore accomplished in a continuous manner. The procedure in the prior art has been to evaporate partially the solution and then cool it to recover substances insoluble in cold alcohol, repeating the procedure as many times as necessary. This must be performed on a batch basis.

In the prior art, difficulties have been encountered which have hindered the development of a continuous process. The use of the ordinary pot still type of evaporator heats the entire solution during removal of a portion of the alcohol. This continued heating results in carmelization and other heat induced changes resulting in the deposition of a tarry, syrupy mass which resists the transfer of heat and represents an irrecoverable loss in material from the process. A similar effect occurs with other evaporators. Furthermore, the miscibility of soybean oil in alcohol in the neighborhood of the boiling point is substantially complete. This behavior seems to preclude the possibility of a hot continuous process.

In the prior art, another difficulty in the extraction of soybean oil with alcohol is encountered in the stage of the process permitting the recovery of the major portion of the oil by settling out the droplets. This separation usually requires four or five hours. Through the use of a natural-circulation, long-tube, rising-film evaporator, we have found that relatively large drops of oil can be separated in a disengaging column or chamber where the vaporized alcohol is freed from the unevaporated liquid, and that, if these drops of separated material are removed from the solution in a separator, the evaporator does not become fouled and the increased concentration of the solution may proceed. In this manner, residual oil can be obtained economically and continuously from the solution. By a second similar stage, the valuable byproduct consisting of crude lecithin and sugar can be obtained economically and continuously.

An embodiment of our invention is illustrated in the accompanying drawing which is in the form of a schematic flow diagram. In this diagram, the numerals 11, 12, and 13 designate the evaporator, column or chamber, and separator, respectively, referred to above.

The second stage of the process operates on solution withdrawn from the first stage on the return line 14 between the separator and the evaporator. The rate of withdrawal of solution from the first stage must be regulated to the rate of influx of fresh extract and the rate of removal of alcohol in the evaporator. The object of such regulation is the maintenance of the concentration of oil and other materials in the solutions in the region where the clear oil carrying a small amount of alcohol separates from the solution. The end point of this region is sharply defined, and, when the concentration is carried beyond the proper point, the thick dark lecithin and sugar mixture begins to separate in the first stage instead of in the second. The concentration of this sharply defined point is dependent upon the temperature at which the concentration takes place since the solubility of the oil in the alcohol is a function of the temperature and also since the temperature at which the concentration takes place is dependent upon the pressure existing in the system. For example, the process may be carried out under a pressure of about 500 mm. of mercury under which condition the boiling point of the alcohol, and consequently the temperature of the evaporation, is about 67.5° C., and the sharply defined point is reached when the solution has been concentrated to one-ninth of its original volume. However, this invention is not limited to the use of any specific pressure with its corresponding temperature since the process can be carried out at higher and lower pressures and temperatures than those indicated in the above example. Furthermore, it is not necessary to maintain a temperature differential between the evaporator and the separator. The process proceeds satisfactorily in either case although more economically without the temperature difference.

The second stage utilizes similar evaporator 15, disengaging column or chamber 16, and separator 17, and it operates in the same manner as the first stage. The thick dark mixture which separates in the second stage separator 17 consists of lecithin, sugar, and a small amount of oil, the quantities of the latter depending upon the concentration maintained in the first stage. The quantity of sugar dissolved from the bean during the extraction of the oil depends on the strength of the alcohol, since the solubility of sugar increases as the alcohol concentration decreases from 100 percent. This variation in the relative quantity of sugar to that of lecithin is not great however since the ethyl alcohol normally used for oil extraction varies only between about 95 percent and 100 percent. Since the concentration of the sugar and oil in the separated composition vary independently, the concentration of the lecithin also varies. The quantity of sugar relative to that of lecithin varies with the variety and the agronomic history of the original bean.

Although the relative quantities of sugar and lecithin in the separated composition cannot be controlled, the quantity of oil can be varied by controlling the amount of oil removed in the first stage. By retaining all the oil from the first stage, a composition of matter is obtained consisting of about 70 percent of soybean oil, about 25 percent of crude lecithin, and about 5 percent of crude sugars. By removing as much oil as practicable in the first stage, another variety of this composition of matter is obtained consisting of about 20 percent of soybean oil, about 65 percent of crude lecithin, and about 15 percent of crude sugars. Consequently, by varying the amount of oil removed in the first stage, compositions intermediate of these two extremes may be obtained, namely, 20 to 70 percent soybean oil, 25 to 65 percent lecithin, and 5 to 15 percent sugars. When separated into cooling pans, the material solidifies on cooling and may be used as a raw material in the chocolate industry or it may be processed by known methods for the recovery of lecithin and sugar as well as the small amount of oil.

The alcohol vapors from the columns or chambers 12 and 16 are delivered through pipes 18 and 19, respectively, to a condenser 20, from which they are recovered as the condensate.

This invention is not limited to the use of a natural-circulation, long-tube, rising-film evaporator. Any evaporator with natural or forced circulation in which the solution moves rapidly and in a thin film across the heating surface would be equally effective. Neither the pressure nor the corresponding temperature of vaporization normally encountered when alcohol is used as a solvent have critical limits for the successful operation of our process.

It will be apparent that various changes may be made in the conditions of the process without departing from the spirit and the scope of the invention or sacrificing its advantages.

Having thus described our invention, we claim:

1. In a process of extracting vegetable oils and lecithin from soybean seed material containing them, wherein the soybean seed material is extracted with a hot alcoholic solvent, and the alcoholic extract cooled to separate part of the vegetable oil, leaving an extract containing residual oil, in combination therewith, the improvement comprising a multi-stage continuous process of recovering the alcohol and removing the residual oil and lecithin from the extract, the first stage of said continuous process comprising continuously vaporizing the alcohol to concentrate the extract to cause the continuous separation of vegetable oil while hot, removing the oil from the concentrated alcoholic extract while hot, recycling part of the latter extract to the first stage vaporizing step, the second stage of the said continuous process comprising withdrawing part of the said concentrated alcoholic extract from which the oil was removed as aforesaid and subjecting it to further concentration by evaporation of alcohol to cause the lecithin to separate, the first stage alcohol evaporation and oil separation being controlled to prevent concentration to the point where separation of lecithin would take place in the first stage, the separation of the vegetable oil in the first stage from the concentrated extract being carried out at substantially the temperature of the first stage alcohol evaporation step, the latter evaporation step being at subatmospheric pressure.

2. The process described in claim 1 and in which the separation of lecithin in the second stage is carried out at substantially the temperature of the second stage alcohol evaporation.

3. The process described in claim 1 and in which, in the first and second stage alcohol vaporization, the extract is continuously recirculated and passed rapidly in the form of a film over the evaporating surfaces.

4. The process described in claim 1 in which the alcohol is ethanol.

5. In a process of extracting vegetable oils and lecithin from soybean seed material containing them, wherein the seed material is extracted with a hot alcoholic solvent, the alcoholic extract being cooled to separate part of the vegetable oil, the steps comprising continuously introducing the separated alcoholic extract into a first stage vaporizing zone to evaporate part of the alcohol, continuously passing the hot vapors and concentrated solution through a first stage disengaging zone in which the vaporized alcohol is freed from the unevaporated liquid and in which drops of hot vegetable oil segregate, continuously passing the unevaporated hot liquid containing said drops of oil into a first stage quiescent zone to permit the hot vegetable oil to settle, continuously decanting the supernatant concentrated alcoholic extract and recycling a part thereof to the first vaporizing stage hot, withdrawing a second part thereof to a second stage vaporizing zone, disengaging zone, and quiescent zone in which the latter part is further concentrated by evaporation of alcohol and the lecithin caused to separate in the second stage quiescent zone, the separation of the vegetable oil in the first stage being carried out at substantially the temperature of the first stage alcohol evaporation step, the concentration of the alcohol in the first stage being carried short of the point where a thick dark lecithin mixture begins to separate in the first stage quiescent zone.

6. The process of claim 5 in which the first stage alcohol vaporization and oil settling is controlled to substantially prevent separation of lecithin in the first stage, by correlating the rate of introduction of the separated alcoholic extract to the first stage evaporation with the rate of evaporation of alcohol in the first stage and with the rate of withdrawal of the second part, to prevent lecithin deposition at the temperature of the first stage quiescent zone.

7. The process of claim 5 in which the separation of lecithin in the second stage is carried out at substantially the temperature of the second stage alcohol evaporation step, both evaporation stages being under subatmospheric pressure.

8. The process of claim 7 in which the pressure is 500 mm. mercury and the temperature of evaporation is 67.5° C.

9. In a process of extracting the vegetable oils and lecithin from soybean seed material, wherein the material is extracted with a hot alcoholic solvent and the extract treated to recover vegetable oil therefrom, leaving an extract containing residual oil, in combination therewith, the improvement comprising a multi-stage continuous process of recovering the alcohol and removing the residual oil and lecithin from the extract, the first stage of said continuous process comprising continuously vaporizing the alcohol to concentrate the extract to cause the continuous separation of vegetable oil while hot, removing the oil from the concentrated alcoholic extract while hot, recycling part of the latter extract to the first stage vaporizing step, the second stage of the said continuous process comprising removing part of the said concentrated alcohol extract and subjecting it to further concentration by evaporation of alcohol to cause the lecithin to separate, the first and second stage evaporation being under sub-atmospheric pressure, the extract being continuously recirculated in each stage and passed rapidly in the form of a rising thin film through the evaporation zones, the separation of the vegetable oil in the first stage being carried out at substantially the temperature of the first stage alcohol evaporation step, the separation of lecithin in the second stage being carried out at substantially the temperature of the second stage alcohol evaporation, the first stage alcohol evaporation and oil separation being controlled to prevent concentration to the point where separation of lecithin would take place in the first stage.

10. The process of claim 9 in which the alcohol is ethanol and the temperature of evaporation is 67.5° C. and the pressure is 500 mm. mercury.

11. In a process for the extraction of vegetable oils from soybean seed material by an alcoholic solvent in which a separated oil and a resulting alcoholic solution containing dissolved residual vegetable oil is produced, the steps comprising rapidly and continuously conducting a thin rising film of said alcoholic solution upwardly over a hot surface to evaporate part of the alcoholic solvent, passing the vapors and the hot concentrated solution through a disengaging zone in which the vaporized alcohol is freed from the hot unevaporated liquid and in which drops of oil segregate, passing the hot unevaporated liquid containing said drops of oil into a quiescent zone to permit the hot oil to settle, continuously recycling part of the supernatant liquid upwardly over the said hot surface, withdrawing another part of the supernatant liquid to a lecithin recovery system, the said alcohol evaporation and oil separation being controlled to prevent concentration to the point where separation of lecithin would take place therein.

ARTHUR C. BECKEL.
PAUL A. BELTER.

REFERENCES CITED

The following references are of record in the file of this patent:

UNITED STATES PATENTS

| Number | Name | Date |
|---|---|---|
| 1,019,945 | Buer | Mar. 12, 1912 |
| 1,892,366 | Sato | Dec. 27, 1932 |
| 2,069,187 | Kraybill | Jan. 26, 1937 |
| 2,278,647 | Cyphers | Apr. 7, 1942 |
| 2,377,975 | Singer | June 12, 1945 |
| 2,377,976 | Singer | June 12, 1945 |